United States Patent
Schenk et al.

(10) Patent No.: US 10,328,496 B2
(45) Date of Patent: Jun. 25, 2019

(54) DRILLING CHUCK

(71) Applicant: Roehm GmbH, Sontheim/Brenz (DE)

(72) Inventors: Peter Schenk, Niederstotzingen (DE); Patrick Hengsberger, Sontheim/Brenz (DE); Hans Baumann, Sontheim-Brenz (DE)

(73) Assignee: Roehm GmbH, Sontheim/Brenz (DE)

( * ) Notice: Subject to any disclaimer, the term of this patent is extended or adjusted under 35 U.S.C. 154(b) by 7 days.

(21) Appl. No.: 15/609,053

(22) Filed: May 31, 2017

(65) Prior Publication Data

US 2017/0348774 A1 Dec. 7, 2017

(30) Foreign Application Priority Data

Jun. 1, 2016 (DE) .......................... 10 2016 110 110

(51) Int. Cl.
*B23B 31/12* (2006.01)
*B25D 17/08* (2006.01)

(52) U.S. Cl.
CPC ........ *B23B 31/123* (2013.01); *B23B 31/1238* (2013.01); *B25D 17/084* (2013.01); *B25D 2250/301* (2013.01); *Y10T 279/17632* (2015.01)

(58) Field of Classification Search
CPC ............... B23B 31/123; B23B 31/1238; Y10T 279/17615; Y10T 279/17623; Y10T 279/17632; B25D 17/084
See application file for complete search history.

(56) References Cited

U.S. PATENT DOCUMENTS

| | | | | |
|---|---|---|---|---|
| 6,073,939 A | * | 6/2000 | Steadings | B23B 31/123 |
| | | | | 279/140 |
| 6,247,706 B1 | * | 6/2001 | Kuo | B23B 31/1238 |
| | | | | 279/140 |
| 6,260,856 B1 | * | 7/2001 | Temple-Wilson | |
| | | | | B23B 31/1238 |
| | | | | 279/140 |
| 6,488,286 B2 | * | 12/2002 | Yaksich | B23B 31/123 |
| | | | | 279/62 |

(Continued)

FOREIGN PATENT DOCUMENTS

| | | | |
|---|---|---|---|
| DE | 10 2010 062 014 B3 | 5/2012 | |
| DE | 10 2013 111 731 A1 | 4/2015 | |
| FR | 2920104 A1 * | 2/2009 | ........... B23B 31/123 |

*Primary Examiner* — Eric A Gates
(74) *Attorney, Agent, or Firm* — Muncy, Geissler, Olds & Lowe, P.C.

(57) ABSTRACT

A drilling chuck for operation on an impact drilling spindle, which can be subjected to tangential loading, with a chuck body, which is connected or connectable to the impact drilling spindle in which jaw guides are formed, which are arranged inclined to the chuck axis, in which clamping jaws are guided which can be adjusted by means of a threaded ring, with a clamping sleeve, which is coupled in a torque-transmitting manner to the threaded ring, and with a locking device, which is adjustable between a release configuration which enables a relative rotation of the threaded ring with respect to the chuck body, and a locking configuration which obstructs or prevents this relative rotation. The locking device is formed from a locking sleeve, which is essentially rotationally fixed but axially displaceable with respect to the chuck body, which locking sleeve comprises at least one locking member.

17 Claims, 8 Drawing Sheets

(56) References Cited

U.S. PATENT DOCUMENTS

| | | | | |
|---|---|---|---|---|
| 6,517,295 | B2* | 2/2003 | Lin | B25B 21/00 |
| | | | | 279/125 |
| 7,360,770 | B2* | 4/2008 | Luckenbaugh | B23B 31/123 |
| | | | | 279/140 |
| 7,491,020 | B2* | 2/2009 | Gehret | B23B 31/1238 |
| | | | | 279/134 |
| 7,520,512 | B2* | 4/2009 | Campbell | B23B 31/1238 |
| | | | | 279/60 |
| 7,845,651 | B2* | 12/2010 | Yaksich | B23B 31/123 |
| | | | | 279/140 |
| 8,950,508 | B2 | 2/2015 | Hoop et al. | |
| 9,016,699 | B2* | 4/2015 | Sakamaki | B23B 31/123 |
| | | | | 279/62 |
| 9,486,858 | B2* | 11/2016 | Schenk | B23B 31/1207 |
| 2015/0115550 | A1* | 4/2015 | Schenk | B23B 31/123 |
| | | | | 279/60 |
| 2017/0252832 | A1* | 9/2017 | Zhou | B23B 31/123 |
| 2017/0334000 | A1* | 11/2017 | Zhou | B23B 31/123 |

\* cited by examiner

DRILLING CHUCK

This nonprovisional application claims priority under 35 U.S.C. § 119(a) to German Patent Application No. 10 2016 110 110.9, which was filed in Germany on Jun. 1, 2016, and which is herein incorporated by reference.

BACKGROUND OF THE INVENTION

Field of the Invention

The invention relates to a drilling chuck for operation on an impact drilling spindle that can be subjected to tangential loading, with a chuck body connected or connectable to the impact drilling spindle, in which jaw guides are formed, which run in an inclined manner towards the chuck axis, in which clamping jaws are guided which are adjustable by means of a threaded ring, with a clamping sleeve coupled with the threaded ring in a torque-transmitting manner, and with a locking device which is adjustable between a release configuration, which enables a relative rotation of the threaded ring with respect to the chuck body, and a locking configuration, which obstructs or prevents this relative rotation.

Description of the Background Art

A drilling chuck of the type mentioned in the introduction is to be taken from DE 10 2013 111 731 A1, which corresponds to US2015/0115550, which is incorporated herein by reference. The rounded jaw drilling chuck shown therein has an axially operable locking device, which is to obstruct or prevent a relative rotation of the threaded ring relative to the chuck body. This is to ensure that the clamping jaws are neither loosened nor additionally tensioned during operation of the drilling device.

A hand-held power tool is shown in DE 10 2010 062 014 B3, which corresponds to U.S. Pat. No. 8,950,508, and which comprises a tangential impact mechanism. In paragraph 26 of this patent, the tangential impact mechanism is described in more detail, to which reference shall be made here. A tangential impact mechanism usually has an impact drilling spindle, to which an anvil is assigned. This anvil is connected non-rotatably with the impact drilling spindle. Furthermore, the machine drive comprises a hammer which transmits rotating and partially tangentially percussive movements over the anvil to the impact drilling spindle. During this operation, there is a temporarily strongly increased torque on the drilling chuck body, which is coupled to the impact drilling spindle. Due to these increased torques, locking devices of drilling chucks are threatened to be overridden.

Thus, in conventional drilling chucks, it has been shown that in impact drilling operations or impact wrench operations, the locking devices could transition from the locking configuration into the release configuration, which can lead to a loosening of the tool on the one hand, or to an extreme tensioning of the drilling chuck on the other hand.

SUMMARY OF THE INVENTION

It is therefore an object of the present invention to further develop a drilling chuck of the type mentioned above in such a way that it also reliably operates when a tangential impact mechanism is used.

According to an exemplary embodiment of the invention, the locking device is formed from an essentially rotationally fixed locking sleeve, but which is axially displaceable with respect to the chuck body. The locking sleeve comprises at least one locking member, wherein the threaded ring or a part connected therewith is assigned at least one locking recess for receiving the at least one locking member. Furthermore, the at least one locking member is adjustable by means of a switching ring, which is rotatably mounted with respect to the chuck body, between a position corresponding to the locking configuration, engaged in the at least one locking recess, and a position corresponding to the release configuration, disengaged from the at least one locking recess. This embodiment has the advantage that the drilling chuck can also be used on a drilling machine which has a tangential impact mechanism. During operation of the drilling machine with the tangential impact mechanism, it is ensured that the drilling chuck according to the invention is not inadvertently moved from the locking configuration into the release configuration.

In this connection, it has proven to be advantageous if the locking device is configured in such a way that it stops the relative rotation that occurs in the locking configuration both in the direction of rotation corresponding to the release of the drilling chuck as well as in the direction of rotation corresponding to the retensioning of the drilling chuck. In drilling chucks known from the prior art, the locking device is designed in such a way that it permits retensioning of the drilling tool. In the case of known drilling chucks, therefore, the loss of clamping force resulting from the rotating clamping jaws and the centrifugal forces acting on them is to be compensated by the retensioning. This retensioning is prevented in the present invention, since the torques are so high when used on a tangentially loaded impact drilling spindle that the drilling chuck would become too tight and the tool employed could no longer be loosened.

In this case, it is advantageous if the at least one locking member is positively inserted into the at least one locking recess in the engaged position.

An embodiment provides that the switching ring can have at least one switching input, and that at least one switching member, which, in the locking configuration, can be accommodated in the at least one switching input, is assigned to the locking sleeve. As a result, fixed switching positions for the switching ring can be realized.

In order to be able to reliably adjust the switching member, it has been found to be preferable within the scope of the invention when the at least one switching member has at least one control surface, which is designed in such a way that the switching member is disengaged from the switching input as soon as the switching ring is turned with a predetermined torque relative to the chuck body. In addition, it is useful if the switching input comprises a control curve corresponding to the control surface. Preferably, a plurality of the switching members are provided, the number of which preferably corresponds to the number of switching inputs formed in the switching ring.

In order to be able to provide a particularly stable locking device, it is advantageous if the locking sleeve has a locking ring with a plurality of locking members, and if the clamping sleeve, which is coupled in a torque-transmitting manner to the threaded ring, is assigned a receptacle ring with a plurality of locking recesses.

The chuck body can have axial guides in which guide members of the locking sleeve are guided. In order to make the drilling chuck particularly compact, it is advantageous if the guide members are formed in one piece with the switching members.

Furthermore, the locking sleeve can be acted upon by a restoring spring. As a result, the locking sleeve is always pressed in the direction of the engaged position by the restoring spring. In other words, the drilling chuck has an urge to move to the locking configuration. If the drilling chuck is to be moved to the release configuration, the user must adjust the switching ring actively against the spring force of the restoring spring, with a preferably predetermined torque with respect to the chuck body, in order to push the locking members from the locking recesses. Should the at least one switching member not align with the associated switching input of the switching ring when the switching ring is released or loosened, then the switching member is turned during operation of the drilling chuck with respect to the switching input by means of a tangential impact mechanism until they are once again aligned with each other. The restoring spring thereby presses the switching member into the switching input, whereby the locking member automatically returns to its engaged position. This also takes place when the locking members of the locking ring are not aligned with the locking recesses of the receptacle ring; in this case, too, the locking ring is turned with respect to the receptacle ring until the locking members can again be moved into the engaged position. It is thus ensured that the drilling chuck automatically moves from the released position into the locking position, even if the locking position has not been actively set by the user.

The restoring spring can be supported on a spring retainer formed on the clamping sleeve and/or on the threaded ring.

In order to provide predefined switching positions for the switching ring, it is expedient if a stop sleeve is arranged on the chuck body in a rotationally fixed and axially non-displaceable manner, and if the stop sleeve comprises at least one stop for limiting the rotation of the switching ring.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
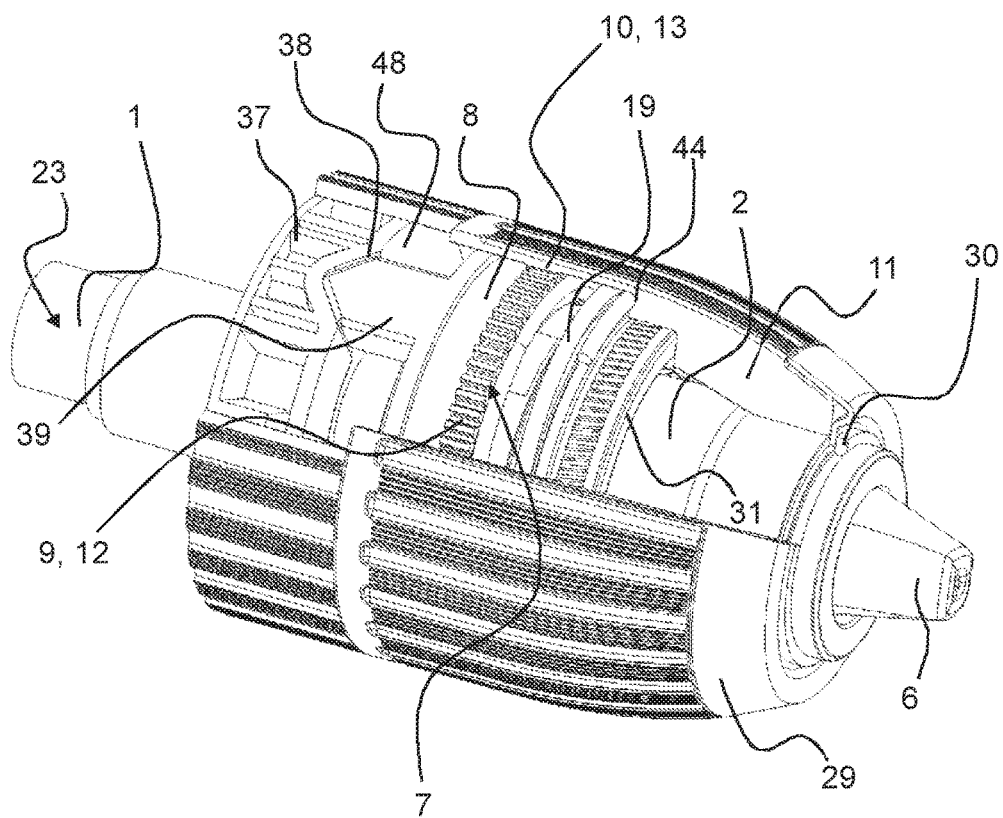
FIG. 1 is a perspective view, partly in section, of a drilling chuck according to the invention.

In the figures, a drilling chuck with a chuck body 2 is shown, which is provided for operation on an impact drilling spindle 1, which can be subjected to tangential loading. In the embodiment according to FIGS. 1 to 7, the impact drilling spindle 1 is fixedly connected to the chuck body 2 and formed in one piece with it. The impact drilling spindle 1 has a connection 23 for an anvil of a tangential impact mechanism, which in the present case is formed by two flattenings 24 which prescribe the rotationally fixed position of the anvil. In the embodiments according to FIGS. 8 and 9, spindle mounts 25 are alternatively formed in the chuck body 2, to which a corresponding impact drilling spindle 1 can be connected. In the embodiment according to FIG. 8, the spindle mount 25 is formed with a mating thread 26, into which an impact drilling spindle 1 with a threaded part 47 is screwed. In the embodiment according to FIG. 9, the spindle mount 25 is formed with a non-circular cross-section for receiving a spindle pin.

Figure 5:
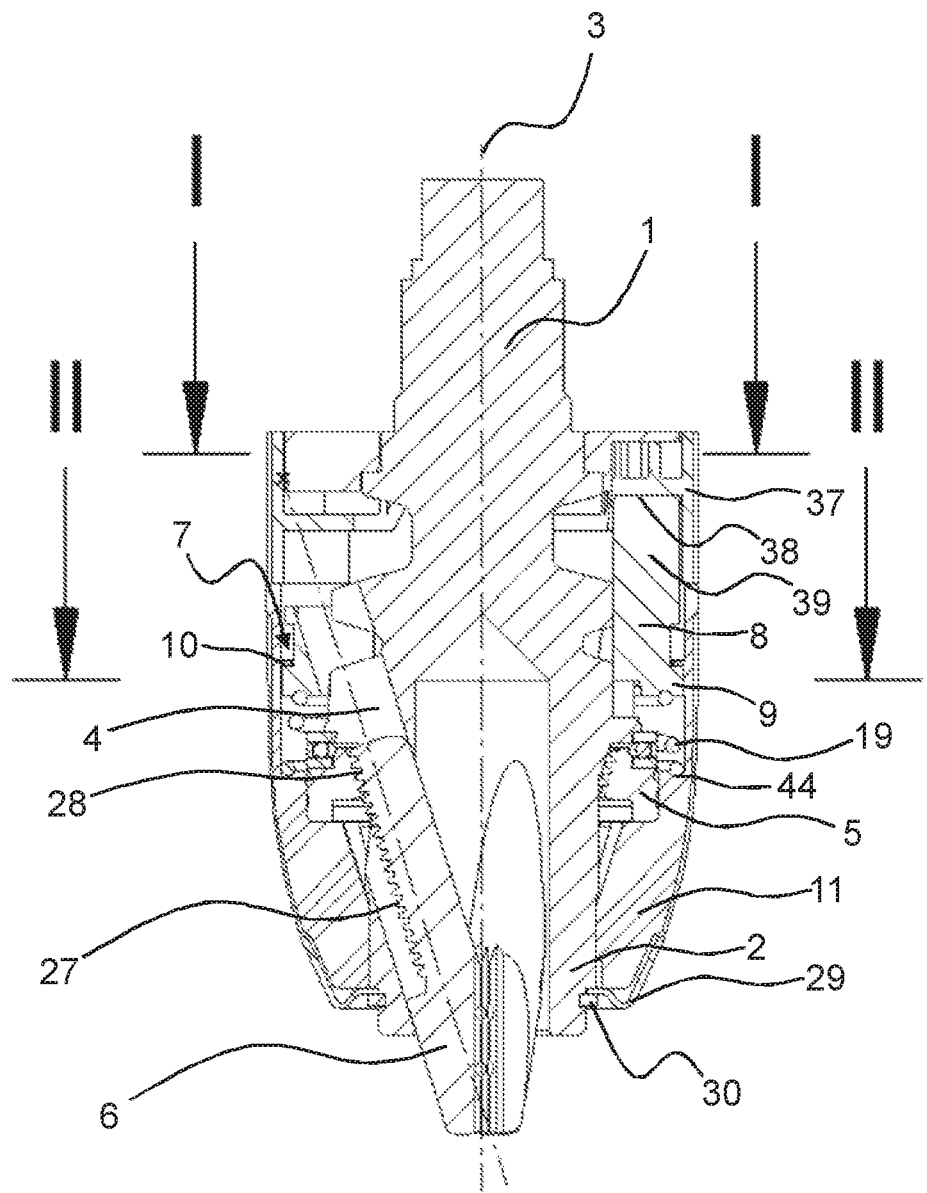
FIG. 5 is a longitudinal cross-section through the drilling chuck from FIG. 1.
Figure 8:
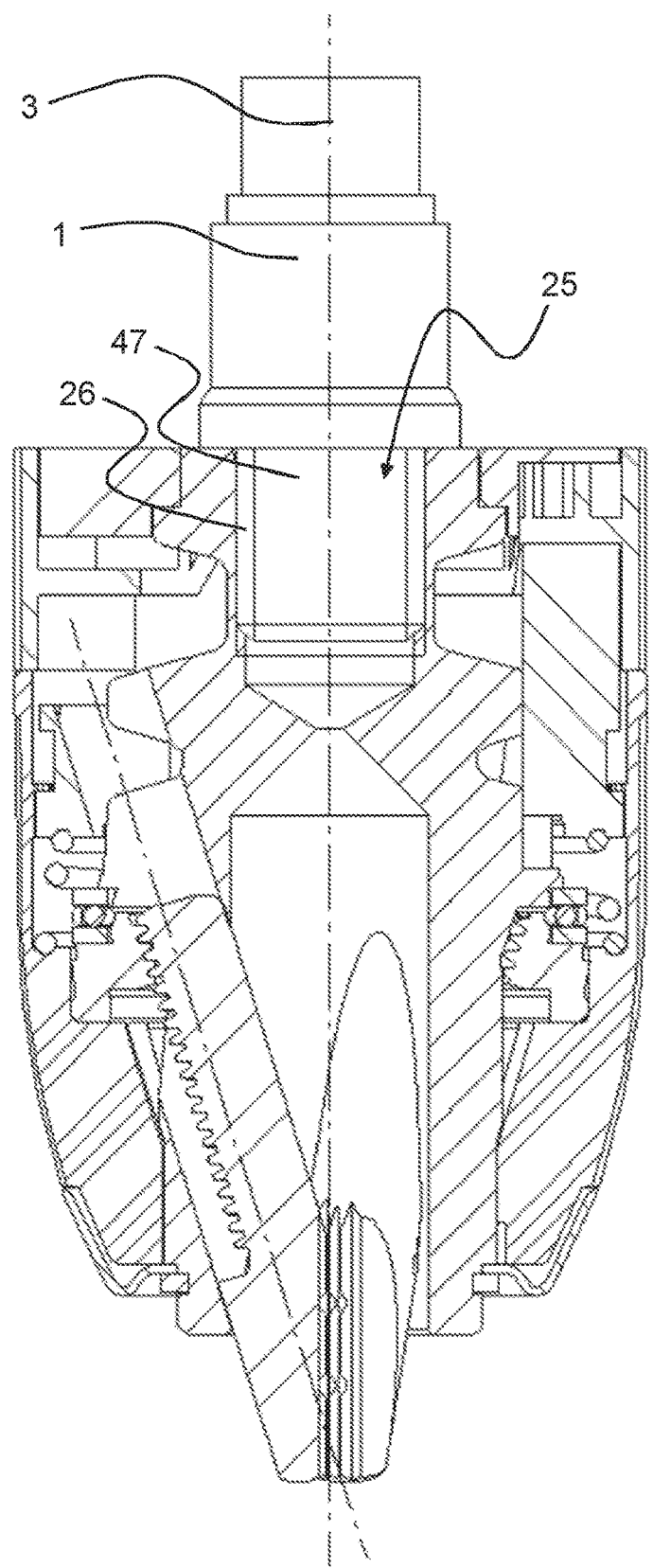
FIG. 8 illustrates an embodiment of the drilling chuck according to the invention, with attached impact drilling spindle.
Figure 9:
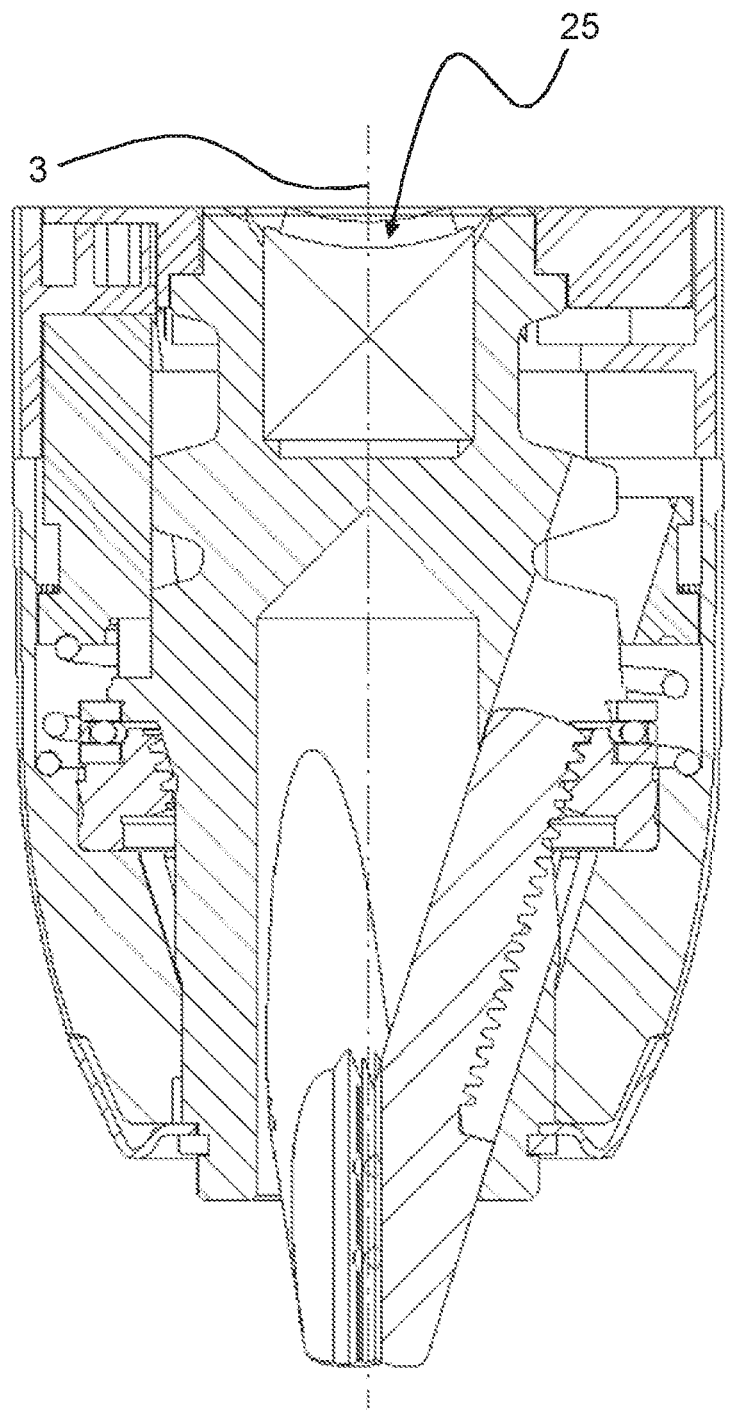
FIG. 9 illustrates an embodiment of the drilling chuck according to the invention.

In all drilling chuck embodiments, jaw guides 4 are formed, which run inclined to the chuck axis 3, and in which clamping jaws 6 are guided, which have a toothing 27, which are connected with a clamping thread 28 of the threaded ring 5 (FIGS. 5, 8, 9). The clamping jaws 6 form a tool holder between them. A turning of the threaded ring 5 causes an opening or a closing of the clamping jaws 6, in order to tension or release a drilling tool or screwing tool arranged between them. In order to be able to turn the threaded ring 5 from the outside, a clamping sleeve 11, which is coupled in a torque-transmitting manner, is provided, which can preferably be actuated manually by a user.

The drilling chucks shown by way of example also have a locking device 7, which is adjustable between a release configuration or clamping configuration that allows a relative rotation of the threaded ring 5 with respect to the chuck body 2, and a locking configuration that obstructs or prevents this relative rotation of the threaded ring 5 with respect to the chuck body 2.

The locking device 7 comprises a locking sleeve 8, which is arranged essentially non-rotatable with respect to the chuck body 2, but which is axially displaceable with respect to the chuck body 2. The locking sleeve 8 has at least one locking member 9, wherein in the exemplary embodiments shown, the locking sleeve 8 comprises a locking ring 12 with a plurality of locking members 9 (FIG. 1). Furthermore, the locking device 7 comprises at least one locking recess 10 assigned to the threaded ring 5, in the present case, assigned to the clamping sleeve 11 connected non-rotatably to the threaded ring 5, for accommodating the at least one locking member 9. In the illustrated embodiments, the clamping sleeve 11 has a receptacle ring 13 with a plurality of locking recesses 10 on its inner side which faces the clamping jaws 6. The number of locking recesses 10 corresponds to the number of locking members 9.

The locking sleeve 8 is axially adjustable by means of a switching ring 37, which is rotatably mounted against the chuck body 2.

Figure 2:
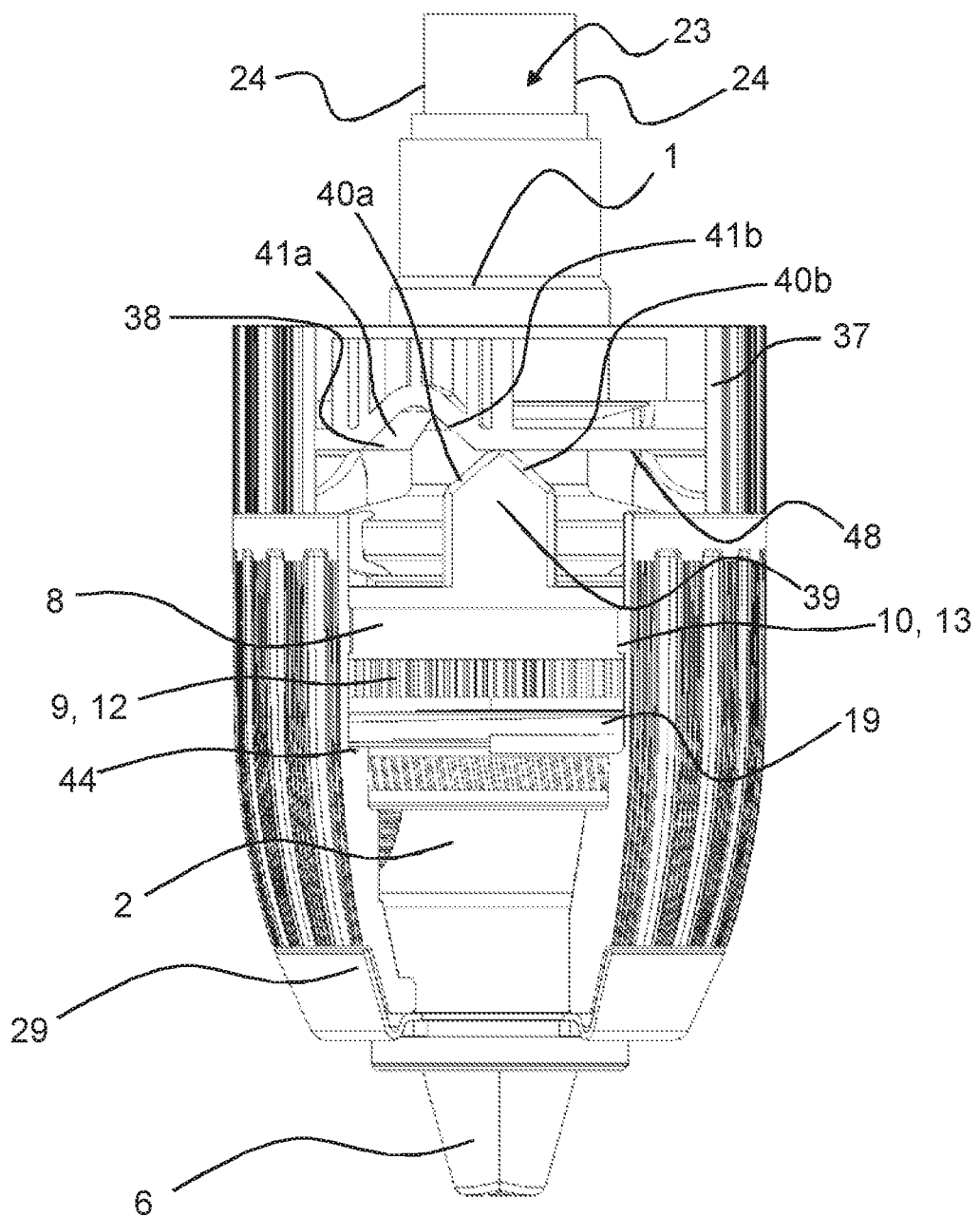
FIG. 2 is a side view, partly in section, of the drilling chuck from FIG. 1, in the release configuration.
Figure 3:
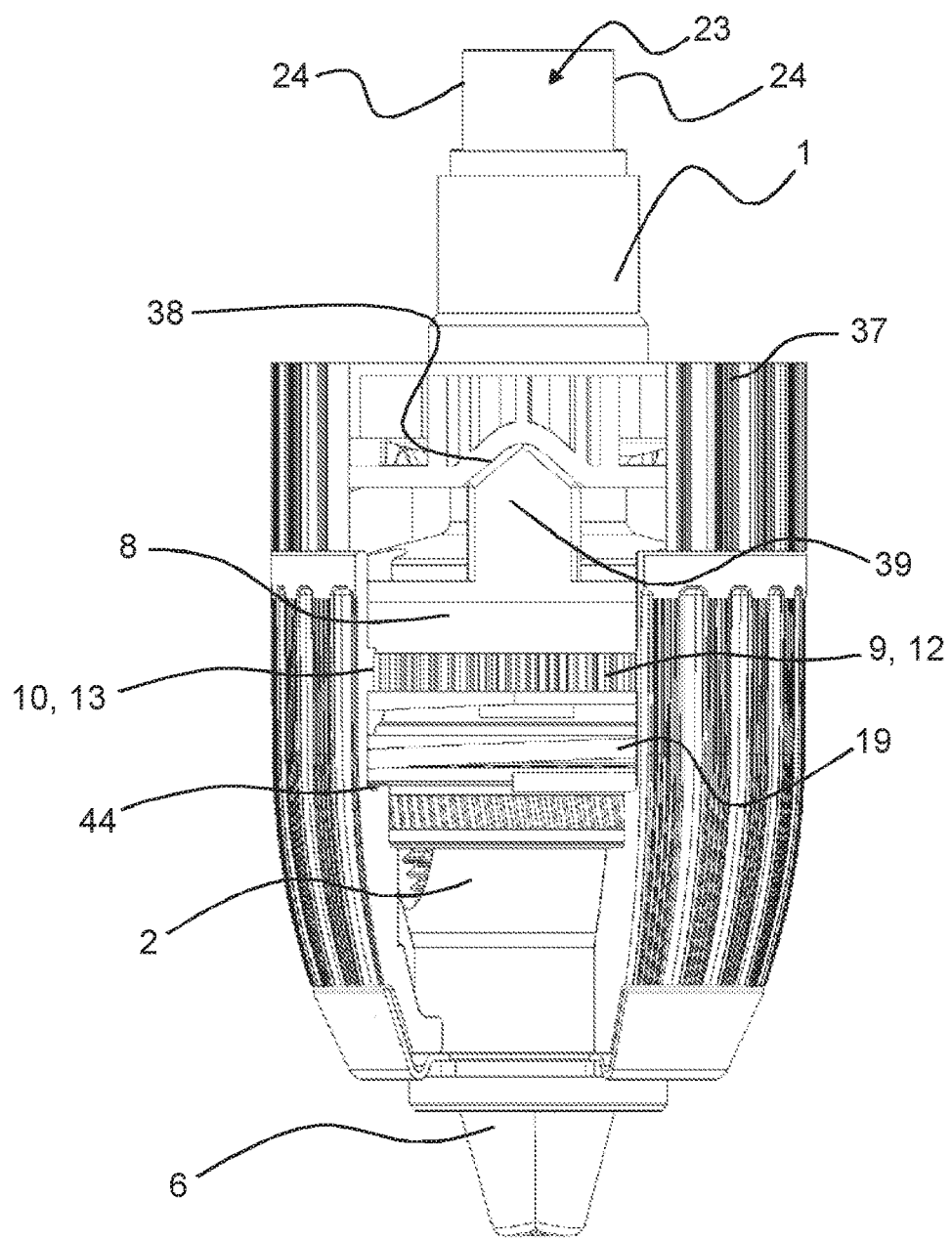
FIG. 3 is a side view, partly in section, of the drilling chuck from FIG. 1, in the locking configuration.

As can be seen from a comparison of FIGS. 2 and 3, in the release configuration and in the locking configuration, the clamping sleeve 11 and the switching ring 37 are axially fixed with respect to the chuck body 2. The clamping sleeve 11 is arranged axially forward, that is to say in the direction of the side of the drilling chuck facing away from the impact drilling spindle 1, by means of a preferably rotatably mounted protective cap 29. For its part, the protective cap 29 is fixed on the chuck body 2 by a snap ring 30. The position of the clamping sleeve 11 is preferably set backwards, i.e., in the direction of the side of the drilling chuck facing the impact drilling spindle 1, by a stop 31 on the threaded body 5.

On the side of the locking sleeve 8 facing the impact drilling spindle 1, a switching member 39 is formed, by means of which the locking sleeve 8 can be axially displaced with respect to the chuck body 2. In the locking configuration, the switching member 39 is accommodated in a switching input 38 (FIG. 3), which is formed in the switching ring 37. The switching ring 37 of the exemplary embodiments shown has exactly three of the switching inputs 38, into which in the locking configuration, a corresponding number of switching members 39 is engaged. More or fewer than three of the switching members 39 and the switching inputs 39 are possible. In order to compensate for centrifugal forces, the switching members 39 or the switching inputs 38 are evenly distributed over the circumference.

The switching members 39 of the embodiments shown each comprise control surfaces 40*a*, 40*b* arranged on both sides, so that during turning of the switching ring 37—both in the first and second directions—the switching members 39 can disengage from the switching recesses 38 with the aid of the control surfaces 40*a*, 40*b*. In order to be able to additionally facilitate this disengagement, the switch holders 38 have control curves 41*a*, 41*b*, preferably formed on both sides.

The locking sleeve 8 is supported axially in the front by a restoring spring 19 so that a restoring force of this restoring spring 19 always effects the locking sleeve 8 in the direction of the impact drilling spindle 1. On its side facing away from the locking sleeve 8, the restoring spring 19 is supported on a spring retainer 44, which is formed on the clamping sleeve 11. Alternatively, the restoring spring 19 can also be supported on a part of the chuck body 2 or on the threaded ring 5. The restoring force shall ensure that the switching members 39 are pressed in the direction of the switching inputs 38, which at the same time leads to the locking members 9 being pressed in the direction of the locking recesses 10.

Figure 7:
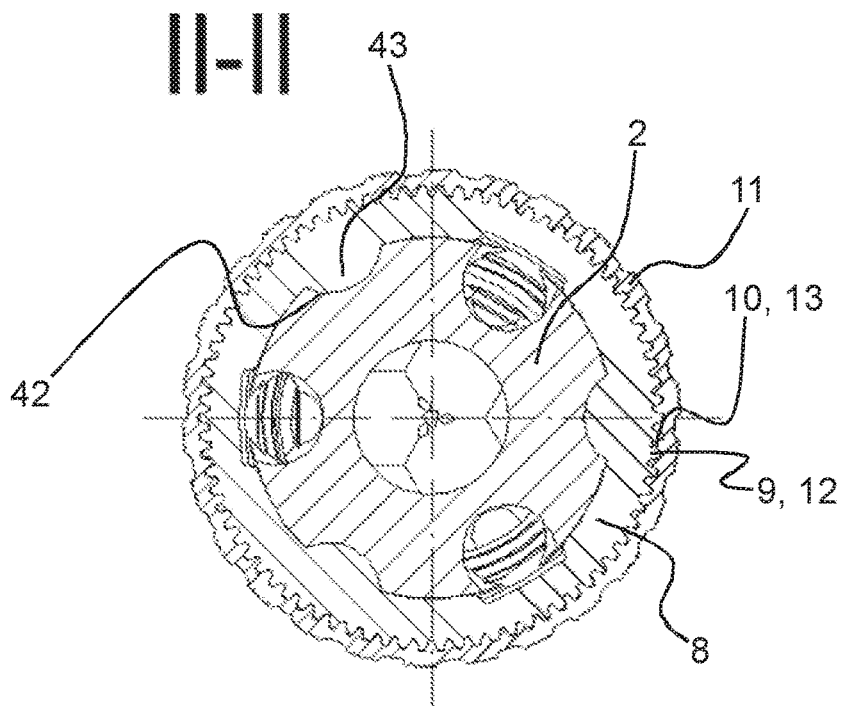
FIG. 7 illustrates the section II-II from FIG. 5.

By turning the switching ring 37, the locking member 9 assigned to the locking sleeve 8 can be adjusted between a position which is engaged in the at least one locking recess 10 of the clamping sleeve 11 and corresponds to the locking configuration, and a position, which is disengaged from the at least one locking recess 10 and corresponds to the release configuration. In other words, with its locking recesses 10, the locking ring 12 is engaged with its locking members 9 into the receptacle ring 13 by means of the restoring spring 19. Should it be positioned such after a turning of the threaded ring 5, that the locking members 9 are not aligned with the locking recesses 10, then the locking ring 12 is positioned on the receptacle ring 13 and/or the switching member 39 is positioned on an end face 48 of the switching ring 37. If in the last scenario the drilling chuck is accelerated in the tangential impact screw operation or in the tangential impact drill operation, a torque will act which causes the switching member 39 to "migrate" along the end face 48 of the switching ring 37 until it is aligned with the switching input 38. By means of this movement, the locking members 9 are aligned with the locking recesses 10, and the locking ring 12 is moved into the engaged position by the force of the restoring spring 19 (FIG. 7). In the engaged position, the relative rotation of the threaded ring 5 with respect to the chuck body 2 is then prevented both in the direction of rotation corresponding to the release of the drilling chuck and in the direction of rotation corresponding to the retensioning of the drilling chuck.

Figure 4:
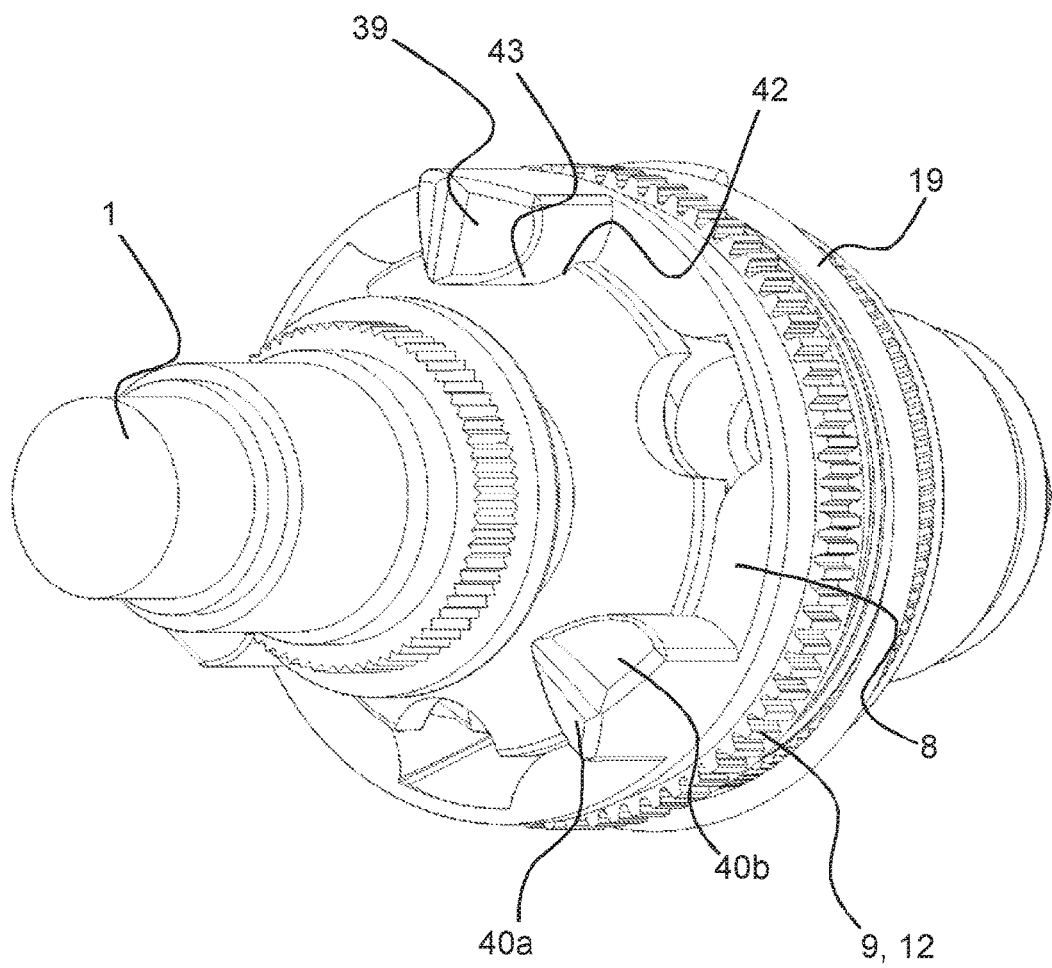
FIG. 4 is a perspective view of the drilling chuck according to FIG. 1, shown without clamping sleeve and without switching ring.

The locking sleeve 8 has a plurality of guide members 43, through which the non-rotational position of the locking sleeve 8 is fixed with respect to the chuck body 2. The chuck body 2, on the other hand, has axial guides 42, in which the guide members 43 of the locking sleeve 8 are guided. A double function is assigned to the switching members 39 in the exemplary embodiment shown, since they are simultaneously configured as guide members 15 (FIG. 4).

Figure 6:
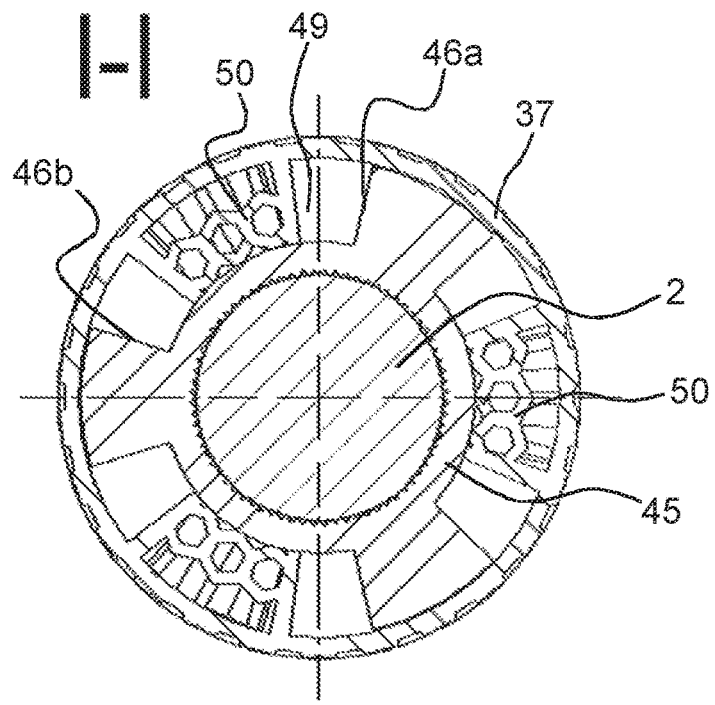
FIG. 6 illustrates the section I-I from FIG. 5.

As is apparent from FIG. 6, section I-I of FIG. 5, a stop sleeve 45 is arranged on the chuck body 2 so as to be non-rotatable and axially non-displaceable. The stop sleeve 45 axially limits or fixes the switching ring 37 on its side facing the impact drilling spindle 1, relative to the chuck body 2. This stop sleeve 45 provides at least one stop 46*a*, 46*b* for limiting the rotation of the switching ring 37. In the embodiments shown, the stop sleeve 45 has a plurality of windows 49, in which stop elements 50 of the switching ring 37 are guided. These windows 49 are in each case limited by a first stop 46*a* and by a second stop 46*b* of the stop sleeve 45. If the stop elements 50 rest either on the first stop 46*a* or on the second stop 46*b*, then the switching member 37 is not located in the switching input 38 and the locking members 9 are disengaged from the locking recesses 10 (FIG. 2). If the switching ring 37 is turned in such a way that the stop elements 50 no longer bear against one of the stops 46*a*, 46*b* of the stop sleeve 45, then—due to the acting restoring spring 19—the stop elements 50 automatically slide to a centered position (FIG. 3). In this case, the control surfaces 40*a*, 40*b* of the switching members 39 slide along the control curves 41*a*, 41*b* of the switch holders 38 so that the drilling chuck is moved into the locking configuration.

The mode of operation of the drilling chuck according to the invention is again described below: In order to be able to tension a drilling or screwing tool in the tool holder, the user is required to turn the switching ring 37 against the spring force of the restoring spring 19. By means of this rotation, the switching members 39 are pressed out of the switching inputs 38 so that the locking sleeve 8 is pressed against the force of the restoring spring 19 in the direction of the clamping jaws 6. The locking sleeve 8 is not turned in this case, since it comprises guide members 43 which slide in the axial guides 42 of the chuck body 2. During this axial movement of the locking sleeve 8, the locking members 9 are moved from the engaged position into the position disengaged from the locking recesses 10. The drilling chuck is now in the release configuration so that the threaded ring 5 can be turned with respect to the chuck body 2, in which the clamping jaws 6 are guided. If, now, the clamping sleeve 11, together with the threaded ring 5, is turned with respect to the chuck body 2 in the rotational direction of the clamping, the tool holder formed by the clamping jaws 6 is closed until the clamping jaws 6 rest with their clamping surfaces on the shank of the drilling or screwing tool.

The switching ring 37 can now be again turned so that the switching member 39 is automatically pushed back into the switching input 38 by the spring force of the restoring spring 19. When the switching member 39 aligns with the switching input 38 or when the locking members 9 align with the locking recesses 10, then the drilling chuck is automatically moved into the locking configuration. If, however, the switching members 39 do not align with the switching inputs 38, or the locking members 9 with the locking recesses 10, then the locking ring 12 is positioned on the receptacle ring 13 and the drilling chuck is still in the release configuration.

During the tangential impact operation of the drilling chuck, however, a torque is introduced which results in an automatic turning of the locking ring 12 with respect to the receptacle ring 13. Thus, if, (for example, after a short time), the locking members 9 are again aligned with the locking recesses 10, then due to the force acting from the restoring spring 19, the locking members 9 engage in the locking recesses 10 and it is ensured that the drilling chucks according to the invention are automatically moved into the locking configuration.

In order to release the drilling chuck(s) again, the switching ring 37 has to be again turned against the force of the restoring spring 19. In doing so, the locking sleeve 8 is again axially displaced, as a result of which the locking members 9 move into the disengaged position. The clamping sleeve 11 connected to the threaded ring 5 can then be turned in the direction of rotation which corresponds to the release until the drilling or screwing tool is released again by the clamping jaws 6.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drilling chuck for operation on an impact drilling spindle that is subjectable to tangential loading, the drilling chuck comprising:
    a chuck body connectable to the impact drilling spindle in which jaw guides are formed, which are arranged inclined to the chuck axis in which clamping jaws are guided that are adjusted via a threaded ring;
    a clamping sleeve coupled to the threaded ring in a torque-transmitting manner;
    a locking device that is adjustable between a release configuration, which enables a relative rotation of the threaded ring with respect to the chuck body and between a locking configuration, which obstructs or prevents the relative rotation,
    wherein the locking device is formed from a locking sleeve, which is mounted substantially non-rotating but axially displaceable with respect to the chuck body, the locking device comprising at least one locking member that the threaded ring or a part connected thereto is assigned at least one locking recess for receiving the at least one locking member, and
    wherein the at least one locking member is adjustable via a switching ring that is rotatably mounted with respect to the chuck body between a position corresponding to the locking configuration, which is engaged in at least one locking recess, and a position corresponding to the release configuration, which is disengaged from the at least one locking recess, the switching ring being configured to be gripped directly by a user when the drilling chuck is in an assembled state.

2. The drilling chuck according to claim 1, wherein the locking device prevents, in the locking configuration, the relative rotation both in the rotational direction corresponding to the release of the drilling chuck as well as in the rotational direction corresponding to the retensioning of the drilling chuck.

3. The drilling chuck according to claim 1, wherein the switching ring has at least one switching input, and wherein the locking sleeve is assigned at least one switching member, which in the locking configuration is accommodated in the at least one switching input.

4. The drilling chuck according to claim 3, wherein the at least one switching member has at least one control surface, which disengages the switching member from the switching input as soon as the switching ring is turned relative to the chuck body with a predetermined torque.

5. The drilling chuck according to claim 4, wherein the switching input comprises a control curve that corresponds to the control surface.

6. The drilling chuck according to claim 1, wherein the locking sleeve has a locking ring with a plurality of locking members, and wherein the clamping sleeve, which is coupled to the threaded ring in a torque-transmitting manner, is assigned a receptacle ring with a plurality of locking recesses.

7. The drilling chuck according to claim 1, wherein the chuck body has axial guides in which guide members of the locking sleeve are guided.

8. The drilling chuck according to claim 1, wherein the locking sleeve is acted upon by a restoring spring.

9. The drilling chuck according to claim 8, wherein the restoring spring is supported on a spring retainer formed on the clamping sleeve and/or on the threaded ring.

10. The drilling chuck according to claim 1, wherein a stop sleeve is arranged on the chuck body so as to be non-rotatable and axially non-displaceable, and wherein the stop sleeve comprises at least one stop for limiting the rotation of the switching ring.

11. The drilling chuck according to claim 1, wherein the switching ring is configured to be gripped and adjusted directly by a user.

12. A drilling chuck for operation on an impact drilling spindle that is subjectable to tangential loading, the drilling chuck comprising:
    a chuck body connectable to the impact drilling spindle in which jaw guides are formed, which are arranged inclined to the chuck axis in which clamping jaws are guided that are adjusted via a threaded ring;
    a clamping sleeve coupled to the threaded ring in a torque-transmitting manner;
    a locking device that is adjustable between a release configuration, which enables a relative rotation of the threaded ring with respect to the chuck body and between a locking configuration, which obstructs or prevents the relative rotation,
    wherein the locking device is formed from a locking sleeve, which is mounted substantially non-rotating but axially displaceable with respect to the chuck body, the locking device comprising at least one locking member that the threaded ring or a part connected thereto is assigned at least one locking recess for receiving the at least one locking member,
    wherein the at least one locking member is adjustable via a switching ring that is rotatably mounted with respect to the chuck body between a position corresponding to the locking configuration, which is engaged in at least one locking recess, and a position corresponding to the release configuration, which is disengaged from the at least one locking recess, the switching ring being configured to be gripped directly by a user,
    wherein the switching ring is configured to be gripped and adjusted directly by a user, and
    wherein, by adjustment by the user, the switching ring is rotatable out of a locking configuration so that the locking sleeve is axially adjusted via the switching ring.

13. A drilling chuck for operation on an impact drilling spindle that is subjectable to tangential loading, the drilling chuck comprising:
- a chuck body connectable to the impact drilling spindle in which jaw guides are formed, which are arranged inclined to the chuck axis in which clamping jaws are guided that are adjusted via a threaded ring;
- a clamping sleeve coupled to the threaded ring in a torque-transmitting manner;
- a locking device that is adjustable between a release configuration, which enables a relative rotation of the threaded ring with respect to the chuck body and between a locking configuration, which obstructs or prevents the relative rotation,
- wherein the locking device is formed from a locking sleeve, which is mounted substantially non-rotating but axially displaceable with respect to the chuck body, the locking device comprising at least one locking member that the threaded ring or a part connected thereto is assigned at least one locking recess for receiving the at least one locking member,
- wherein the at least one locking member is adjustable via a switching ring that is rotatably mounted with respect to the chuck body between a position corresponding to the locking configuration, which is engaged in at least one locking recess, and a position corresponding to the release configuration, which is disengaged from the at least one locking recess, the switching ring being configured to be gripped directly by a user,
- wherein the switching ring is configured to be gripped and adjusted directly by a user, and
- wherein, by adjustment by the user, the switching ring is rotatable out of a locking configuration so that the locking sleeve is axially adjusted via the switching ring such that the locking sleeve and the clamping sleeve are disengaged to allow the clamping sleeve to rotate to open or close the drill chuck.

14. A drilling chuck for operation on an impact drilling spindle that is subjectable to tangential loading, the drilling chuck comprising:
- a chuck body connectable to the impact drilling spindle in which jaw guides are formed, which are arranged inclined to the chuck axis in which clamping jaws are guided that are adjusted via a threaded ring;
- a clamping sleeve coupled to the threaded ring in a torque-transmitting manner;
- a locking device that is adjustable between a release configuration, which enables a relative rotation of the threaded ring with respect to the chuck body and between a locking configuration, which obstructs or prevents the relative rotation,
- wherein the locking device is formed from a locking sleeve, which is mounted substantially non-rotating but axially displaceable with respect to the chuck body, the locking device comprising at least one locking member that the threaded ring or a part connected thereto is assigned at least one locking recess for receiving the at least one locking member, and
- wherein the at least one locking member is adjustable via a switching ring that is rotatably mounted with respect to the chuck body between a position corresponding to the locking configuration, which is engaged in at least one locking recess, and a position corresponding to the release configuration, which is disengaged from the at least one locking recess, the switching ring being configured to be gripped directly by a user, and
- wherein the clamping sleeve is rotatably, fixedly connected to the threaded ring.

15. A drilling chuck for operation on an impact drilling spindle that is subjectable to tangential loading, the drilling chuck comprising:
- a chuck body connectable to the impact drilling spindle in which jaw guides are formed, which are arranged inclined to the chuck axis in which clamping jaws are guided that are adjusted via a threaded ring;
- a clamping sleeve coupled to the threaded ring in a torque-transmitting manner;
- a locking device that is adjustable between a release configuration, which enables a relative rotation of the threaded ring with respect to the chuck body and between a locking configuration, which obstructs or prevents the relative rotation,
- wherein the locking device is formed from a locking sleeve, which is mounted substantially non-rotating but axially displaceable with respect to the chuck body, the locking device comprising at least one locking member that the threaded ring or a part connected thereto is assigned at least one locking recess for receiving the at least one locking member, and
- wherein the at least one locking member is adjustable via a switching ring that is rotatably mounted with respect to the chuck body between a position corresponding to the locking configuration, which is engaged in at least one locking recess, and a position corresponding to the release configuration, which is disengaged from the at least one locking recess, the switching ring being configured to be gripped directly by a user, and
- wherein the clamping sleeve is rotatably, fixedly connected to the threaded ring such that no relative movement between the clamping sleeve and the threaded ring is possible.

16. A drilling chuck for operation on an impact drilling spindle that is subjectable to tangential loading, the drilling chuck comprising:
- a chuck body connectable to the impact drilling spindle in which jaw guides are formed, which are arranged inclined to the chuck axis in which clamping jaws are guided that are adjusted via a threaded ring;
- a clamping sleeve coupled to the threaded ring in a torque-transmitting manner;
- a locking device that is adjustable between a release configuration, which enables a relative rotation of the threaded ring with respect to the chuck body and between a locking configuration, which obstructs or prevents the relative rotation,
- wherein the locking device is formed from a locking sleeve, which is mounted substantially non-rotating but axially displaceable with respect to the chuck body, the locking device comprising at least one locking member that the threaded ring or a part connected thereto is assigned at least one locking recess for receiving the at least one locking member, and
- wherein the at least one locking member is adjustable via a switching ring that is rotatably mounted with respect to the chuck body between a position corresponding to the locking configuration, which is engaged in at least one locking recess, and a position corresponding to the release configuration, which is disengaged from the at least one locking recess, the switching ring being configured to be gripped directly by a user, and
- wherein the switching ring is configured to be operated independently of the clamping sleeve.

17. A drilling chuck, comprising:

a chuck body connectable to an impact drilling spindle in which jaw guides are formed, which are arranged inclined to the chuck axis in which clamping jaws are guided that are adjusted via a threaded ring, the threaded ring having a recess;

a clamping sleeve coupled to the threaded ring in a torque-transmitting manner;

a locking sleeve that is adjustable between a release configuration, which enables a relative rotation of the threaded ring with respect to the chuck body and between a locking configuration, which obstructs or prevents the relative rotation, the locking sleeve mounted non-rotating but axially displaceable with respect to the chuck body and a locking member configured to be received in the recess; and a switching ring, configured to adjust the locking member, rotatably mounted with respect to the chuck body between a position corresponding to the locking configuration and a position corresponding to the release configuration, the switching ring being configured to be gripped directly by a user when the drilling chuck is in an assembled state.

* * * * *